United States Patent
Soh et al.

(10) Patent No.: US 7,817,143 B2
(45) Date of Patent: Oct. 19, 2010

(54) METHOD OF INPUTTING FUNCTION INTO PORTABLE TERMINAL AND BUTTON INPUT APPARATUS OF PORTABLE TERMINAL USING THE SAME

(75) Inventors: Byung-seok Soh, Suwon-si (KR);
Seong-woon Kim, Yongin-si (KR);
Chang-kyu Choi, Seongnam-si (KR);
Jun-ho Park, Hwaseong-si (KR);
Kwon-lu Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1023 days.

(21) Appl. No.: 11/589,881

(22) Filed: Oct. 31, 2006

(65) Prior Publication Data
US 2007/0129046 A1 Jun. 7, 2007

(30) Foreign Application Priority Data
Nov. 1, 2005 (KR) .................. 10-2005-0103785

(51) Int. Cl.
*G06F 3/02* (2006.01)
*G09G 5/00* (2006.01)

(52) U.S. Cl. .................................. 345/170

(58) Field of Classification Search ......... 345/168–172; 715/705, 841
See application file for complete search history.

(56) References Cited

U.S. PATENT DOCUMENTS

| 5,818,361 | A | * | 10/1998 | Acevedo | 341/23 |
| 6,453,471 | B1 | * | 9/2002 | Klosterman | 725/41 |
| 6,894,679 | B2 | * | 5/2005 | Suzuki | 345/169 |
| 2003/0035138 | A1 | * | 2/2003 | Schilling | 358/1.15 |
| 2006/0265669 | A1 | * | 11/2006 | Lee | 715/818 |

* cited by examiner

*Primary Examiner*—Bipin Shalwala
*Assistant Examiner*—Steven E Holton
(74) *Attorney, Agent, or Firm*—Staas & Halsey LLP (57) ABSTRACT

A function input method for providing in advance to a user information on a function to be executed when the user presses a button to execute a specific function in a portable terminal, such as a cellular phone, and a button input apparatus using the same. The method includes: receiving a button input when the user presses one of a plurality of buttons; determining whether a mode of the button input is a touch mode or a click mode; and displaying a preview image of a function corresponding to the pressed button if the button input mode is the touch mode and executing the function corresponding to the pressed button if the button input mode is the click mode.

23 Claims, 6 Drawing Sheets

METHOD OF INPUTTING FUNCTION INTO PORTABLE TERMINAL AND BUTTON INPUT APPARATUS OF PORTABLE TERMINAL USING THE SAME

CROSS-REFERENCE TO RELATED APPLICATION

This application claims the benefit of Korean Patent Application No. 10-2005-0103785, filed on Nov. 1, 2005, in the Korean Intellectual Property Office, the disclosure of which is incorporated herein by reference.

BACKGROUND OF THE INVENTION

1. Field of the Invention

The present invention relates to a portable terminal such as a cellular phone, and more particularly, to a method of inputting a function into a portable terminal by using a plurality of buttons of the portable terminal, and a button input apparatus using the same.

2. Description of Related Art

In general, a user of a portable terminal can select functions thereof, such as making/receiving a phone call and transmitting/receiving a short message, and inputting Korean characters, English characters, and numerals using a plurality of buttons on a side of the portable terminal.

Recently, portable terminals, such as cellular phones, provide not only conventional main functions, such as a phone call function and a short message function, but also functions of other electronic devices. For example, various functions, such as an MP3 file play function, an image capture and reproduction function, an electronic dictionary function, and/or a digital TV function are available in cellular phones.

An increase of the kinds of functions of cellular phones results in an increase of the number of devices for controlling the functions. However, many users expect that these integrated functions will not increase the complexity of using the portable terminal, and the size and price thereof compared to conventional portable terminals.

Although it is not so difficult to integrate various functions into a portable terminal or miniaturize the portable terminal, there are many technical problems to be addressed in order to provide an interface to allow a user to input complex functions and control the portable terminal quickly and easily. For example, the development of a user interface to reduce the number of key inputs performed by a user for a specific function or easily manage, search, and reproduce various kinds of digital content, such as photographs, moving pictures, music, and e-mail, has been required.

Furthermore, the increase of the number of buttons for inputting various functions, is limited by the device size and the complexity of using a larger number of buttons.

In addition, since the complexity of using the portable terminal increases, it is very difficult for a user to memorize button inputs and a button input sequence corresponding to every necessary function, and thus, an undesired function may be executed due to a wrong button input.

BRIEF SUMMARY

An aspect of the present invention provides a function input method for providing in advance to a user schematic information on a function to be executed when the user presses a button to execute a specific function in a portable terminal, such as a cellular phone, and a button input apparatus using the same.

According to an aspect of the present invention, there is provided a method of inputting a function into a portable terminal, the method comprising: receiving a button input when a user presses one of a plurality of buttons; determining whether a mode of the button input is a touch mode or a click mode; and displaying a preview image of a function corresponding to the pressed button if the button input mode is the touch mode and executing the function corresponding to the pressed button if the button input mode is the click mode.

In the determination, it may be determined whether the button input mode is the touch mode using at least one of an electrostatic capacitance sensing sensor and a pressure sensing sensor, and it may be determined that the button input mode is the touch mode if a period of time when the user presses the button, the period of time being sensed using the at least one of the electrostatic capacitance sensing sensor and the pressure sensing sensor while the user is pressing the button, is longer than a specified period of time.

In the determination, it may be determined whether the button input mode is the click mode using a switch working at a pressure greater than a specified pressure, and it may be determined that the button input mode is the click mode if the switch is activated.

The preview image may be one of an execution image of the function, an image indicating information on functions subordinate to the function, and an image corresponding to the pressed button.

In the display of the preview image, when the preview image is a moving picture, an important portion of the moving picture may be displayed. The preview image may be displayed while the user is pressing the button and displayed on a portion of a main screen included in the portable terminal or the entire main screen.

The plurality of buttons may be variable display buttons of which displayed images vary, and the preview image may be displayed on the plurality of buttons.

According to another aspect of the present invention, there is provided a button input apparatus included in a portable terminal, the apparatus comprising: a sensor sensing whether a user touches a button; a switch sensing whether the user presses the button with a pressure greater than a specified pressure; a mode determiner determining whether a mode of a button input obtained by the user pressing the button is a touch mode or a click mode using output signals of the sensor and the switch; and a control signal generator generating a control signal to display a preview image of a function corresponding to the button if the button input mode is the touch mode and to execute the function corresponding to the button if the button input mode is the click mode.

The sensor may be at least one of an electrostatic capacitance sensing sensor and a pressure sensing sensor, and the mode determiner may detect a period of time when the user touches the button by using an output signal of the sensor and determine that the button input mode is the touch mode if the detected period of time is longer than a specified time.

The preview image may be an execution image of the function, an image indicating information on subordinate functions of the function, or an image corresponding to the pressed button.

The preview image may be displayed while the user is pressing the button.

The button input apparatus may further comprise a display unit displaying an image displayed on the button, wherein the image displayed on the display unit can vary, and the preview image is displayed on the display unit.

According to another aspect of the present invention, there is provided a computer recording medium storing a computer readable program for executing the method of inputting a function into a portable terminal.

According to another aspect of the present invention, there is provided a button input apparatus including: a sensor sensing whether a user touches a button; a switch sensing whether a pressure of the touch exceeds a specified threshold; a mode determiner determining whether an input mode of the button is a touch mode or a click mode based on sensing results of the sensor and the switch; and a control signal generator generating a control signal to display a preview image of a function corresponding to the button when the button input mode is the touch mode and to execute the function corresponding to the button when the button input mode is the click mode.

Additional and/or other aspects and advantages of the present invention will be set forth in part in the description that follows and, in part, will be apparent from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
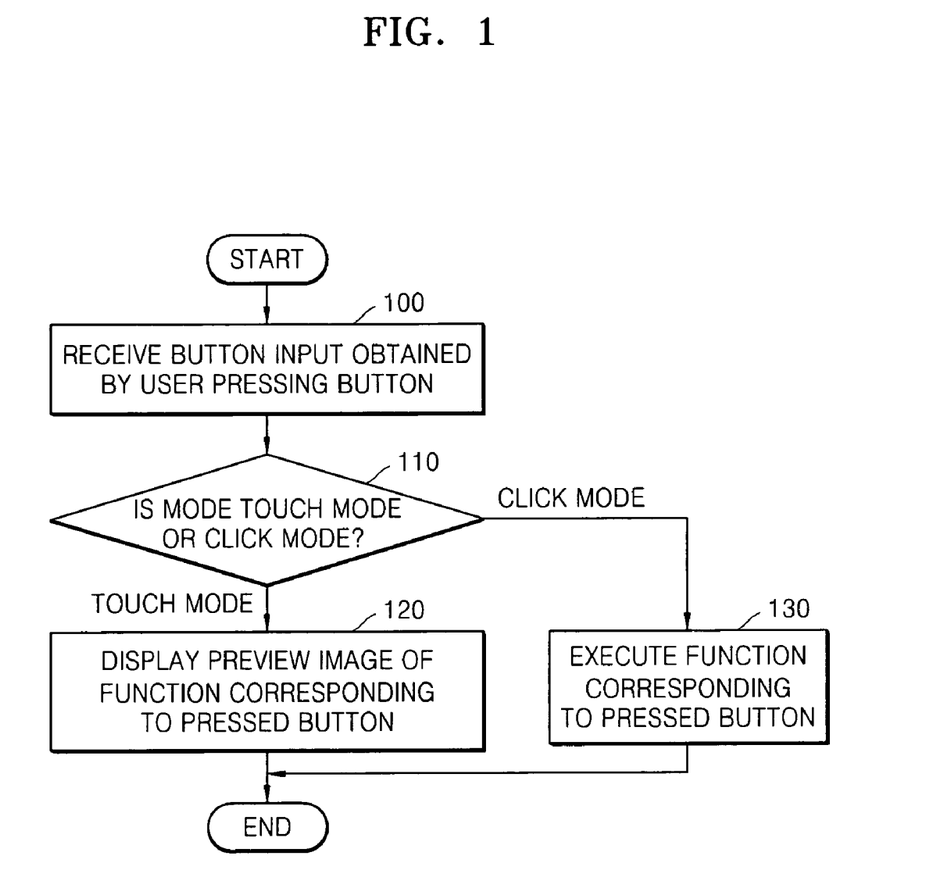
FIG. 1 is a flowchart of a method of inputting a function into a portable terminal according to an embodiment of the present invention.

FIG. 1 is a flowchart of a method of inputting a function into a portable terminal according to an embodiment of the present invention. The function input method illustrated in FIG. 1 will now be described in conjunction with the button input apparatus illustrated in FIG. 6. The button input apparatus illustrated in FIG. 6 includes a sensor 600, a switch 610, a mode determiner 620, and a control signal generator 630.

Figure 6:
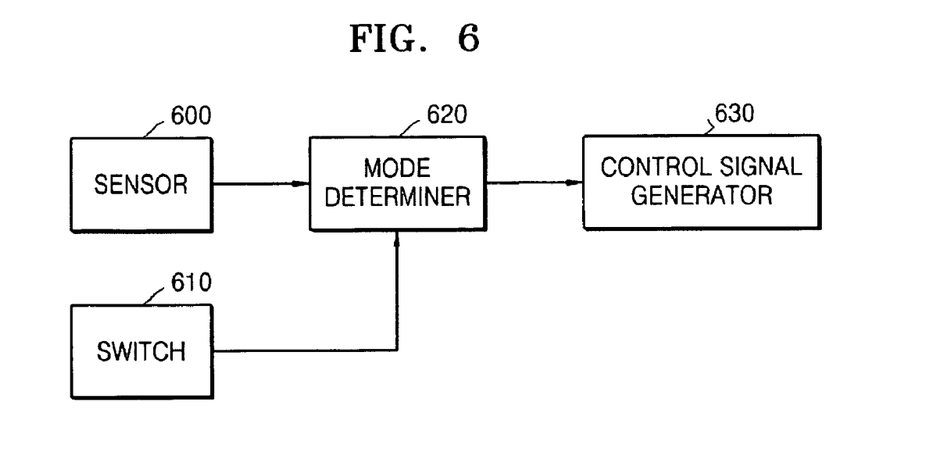
FIG. 6 is a block diagram of a button input apparatus included in a portable terminal, according to an embodiment of the present invention.

The sensor 600 and the switch 610 are included in the portable terminal according to the number of buttons of the portable terminal. For example, if the portable terminal includes 12 buttons, each of the buttons may include the sensor 600 and the switch 610.

When a button input is performed by a user pressing one of a plurality of buttons of the portable terminal, in operation 100, the mode determiner 620 determines whether a mode of the button input is a touch mode or a click mode using output signals of the sensor 600 and the switch 610, in operation 110. The sensor 600 senses whether the user touches a button, and the switch 610 senses whether the user presses a button with a pressure greater than a specified pressure P.

The sensor 600 may be one of an electrostatic capacitance sensing sensor for sensing the user's contact, a pressure sensing sensor for sensing a low pressure generated by the user, a proximity sensor for sensing the user's approach using infrared rays.

The touch mode is a mode when the user presses a button with a pressure lower than the specified pressure P, i.e., when the sensor 600 senses the user's touch and the switch 610 cannot sense the user's click. That is, the touch mode is a mode when an output signal of the sensor 600 is "ON" and an output signal of the switch 610 is "OFF." The click mode is a mode when the user presses the button with a pressure greater than the specified pressure P, i.e., when both the sensor 600 and the switch 610 senses the user's press. That is, the click mode is a mode when both output signals of the sensor 600 and the switch 610 are "ON."

If the mode is the touch mode as the determination result, the control signal generator 630 generates a control signal for controlling a display unit (not shown) included in the portable terminal to display a preview image indicating information on a function corresponding to the pressed button, in operation 120. If the mode is the click mode as the determination result, the control signal generator 630 generates a control signal for controlling a function execution unit (not shown) included in the portable terminal to execute the function corresponding to the pressed button in operation 130. The display unit, which has received the control signal, displays the preview image, and the function execution unit, which has received the control signal, executes the function corresponding to the pressed button.

For example, when the user touches a button corresponding to a short message input function for the touch mode, the display unit displays the description of the short message input function, and when the user clicks the button corresponding to the short message input function for the click mode, the function execution unit executes the short message input function so that the user can input a short message.

Figure 3:
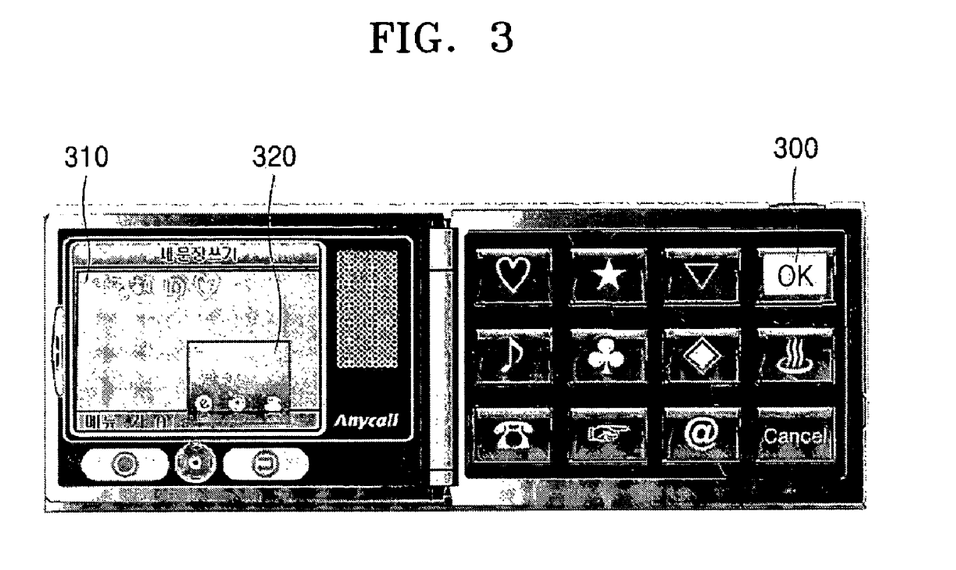
FIG. 3 is a displayed preview image according to an embodiment of the present invention.

FIG. 3 is a preview image displayed in the touch mode, according to an embodiment of the present invention. The preview image provides information on a function corresponding to a touched button by displaying an execution image of the function. When the user touches a button "OK" 300 for the touch mode during a short message input, as a preview image, a function execution image corresponding to the "OK" button 300 is displayed on a predefined portion 320 of a display unit 310 of a portable terminal as illustrated in FIG. 3. As illustrated in FIG. 3, information on a function corresponding to each button can be provided to the user by displaying a function execution image as the preview image. The preview image may be displayed while the user is touching the button 300, i.e., while the mode determiner 620 determines that a mode of the user's button input is the touch mode since an output signal of the sensor 600 is "ON." As described above, by displaying a preview image of a function corresponding to a button while the user is touching the button, the user can know every function corresponding to every button by touching a plurality of buttons sequentially in a short period of time.

Figure 4A:
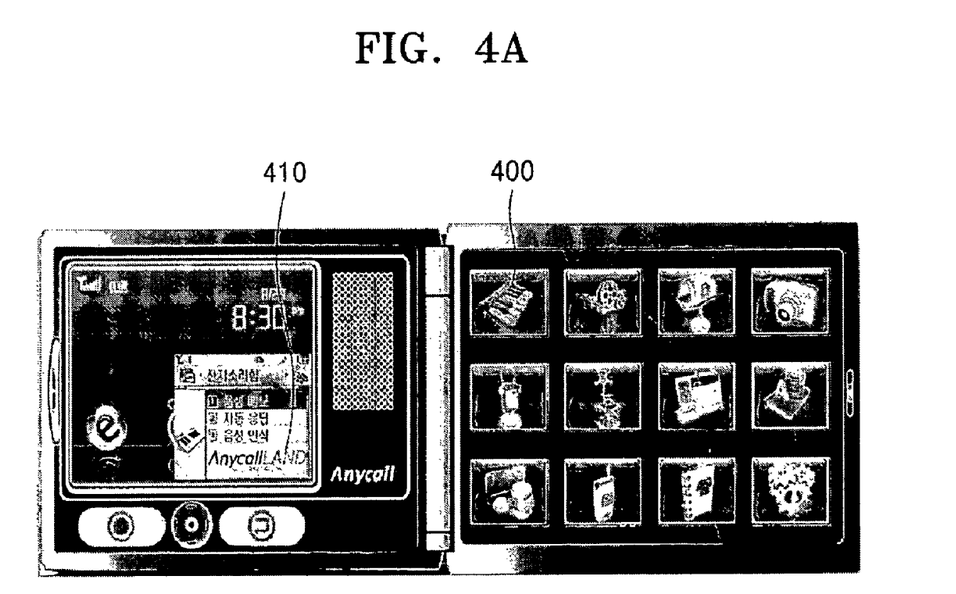
FIGS. 4A and 4B are displayed preview images according to an embodiment of the present invention.

FIGS. 4A and 4B are preview images displayed in the touch mode, according to an embodiment of the present invention. The preview images provide information on a function corresponding to a touched button by displaying functions subordinate to the function. As illustrated in FIG. 4A, when the user touches for the touch mode a button 400 corresponding to an electronic voice mailbox function among buttons on which images of functions are displayed, subordinate functions included in the electronic voice mailbox function, i.e., a voice memo function, an automatic answering function, and a voice recognition function, are displayed on a specified area 410.

Figure 4B:
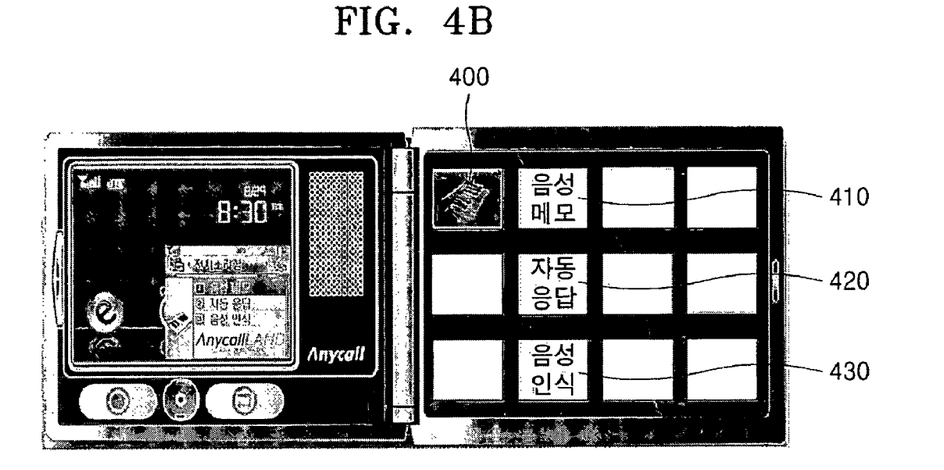

Each of buttons included in a portable terminal may be a variable display button of which an image displayed thereon can vary by including a display unit (not shown) displaying an image. If the buttons included in the portable terminal are variable display buttons displaying variable images, functions subordinate to a function corresponding to a touched button may be displayed on the variable display buttons. For example, as illustrated in FIG. 4B, when the user touches the button 400 corresponding to the electronic voice mailbox function for the touch mode, the subordinate functions included in the electronic voice mailbox function, i.e., the voice memo function, the automatic answering function, and the voice recognition function, are displayed on three buttons 410, 420, and 430, respectively.

Figure 5:
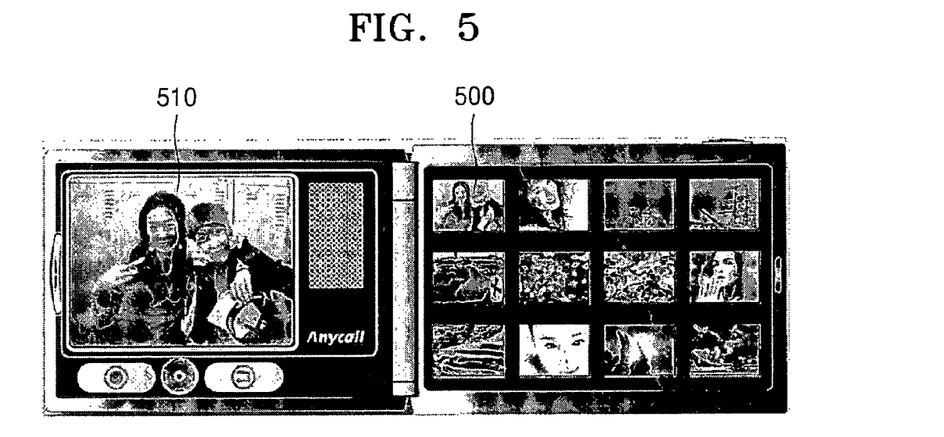
FIG. 5 is a displayed preview image according to an embodiment of the present invention.

FIG. 5 is a displayed preview image according to an embodiment of the present invention. The preview image provides information on a still image or a moving picture corresponding to one of a plurality of buttons by displaying the still image or the moving picture when a portable terminal uses an image reproduction function. As illustrated in FIG. 5, when the user touches in the touch mode a button 500 corresponding to an image among buttons on which images are displayed, the image corresponding to the button 500 is displayed on a display unit 510. A plurality of buttons included in the portable terminal as illustrated in FIG. 5 may be variable display buttons displaying stored images.

The image displayed as the preview image may be displayed only while the user is touching the button 500. When the image corresponding to the touched button 500 is a moving picture, the moving picture may be reproduced from the first scene as the preview image or only important scenes are displayed. When the user clicks the button 500 in the click mode, the image is displayed on the display unit 510, and simultaneously, editing of the image can be performed.

Figure 2:
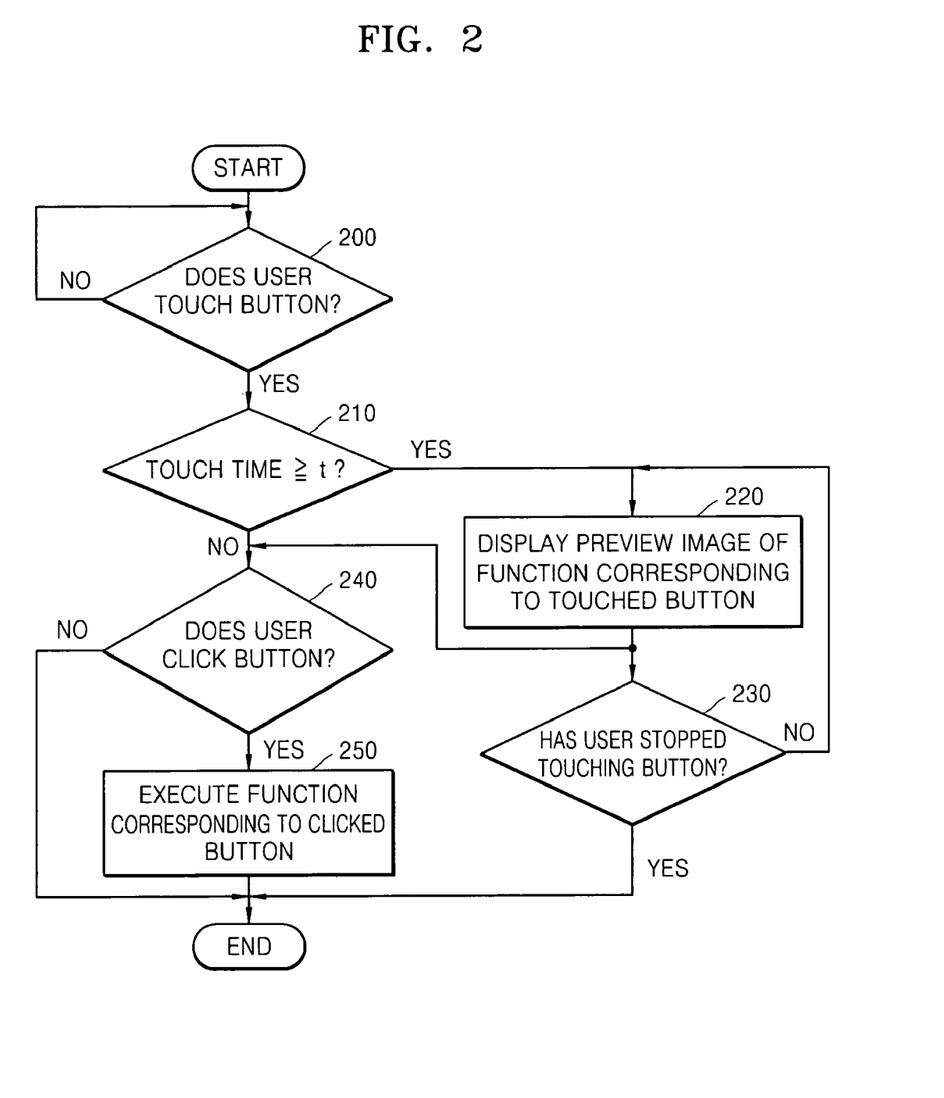
FIG. 2 is a flowchart of a method of inputting a function into a portable terminal according to another embodiment of the present invention.

FIG. 2 is a flowchart of a method of inputting a function into a portable terminal according to an embodiment of the present invention. The function input method illustrated in FIG. 2 will now be described in conjunction with the button input apparatus illustrated in FIG. 6.

The sensor 600, which is included in each of the buttons installed in the portable terminal, senses whether a user touches the button of which it is a part, in operation 200. If the user presses a button, the mode determiner 620 determines, in operation 210, whether the user touched the button for a period of time longer than a specified time t using an output signal of the sensor 600.

If the period of time is longer than the specified time t as the determination result, the mode determiner 620 determines that a mode of a button input corresponding to the touched button is the touch mode, and a display unit (not shown), which has received a control signal generated according to the determination result from the control signal generator 630, displays a preview image indicating information on a function corresponding to the touched button in operation 220. The mode determiner 620 determines, in operation 230, whether the user has stopped touching the button using the output signal of the sensor 600. If the user has stopped touching the button, the control signal generator 630 generates a control signal to finish the display of the preview image and outputs the generated control signal to the display unit. If the user has not stopped touching the button, the process returns to operation 220. According to operations 220 and 230, the preview image indicating the information on the function corresponding to the touched button is displayed only while the user is touching the button, and when the user keeps his/her hand away from the button, the image displayed on the display unit is returned to a previous image.

If the period of time is shorter than the specified time t as the determination result of operation 210, the switch senses, in operation 240, whether the user presses the button with a pressure greater than the specified pressure P, i.e., whether the user clicks the button. If the user clicks the button, the mode determiner 620 determines that a mode of a button input corresponding to the clicked button is the click mode, and a function execution unit (not shown), which has received a control signal generated according to the determination result from the control signal generator 630, executes the function corresponding to the clicked button, in operation 250. The click mode is a mode in which the user directly executes the function corresponding to the clicked button without displaying the preview image of the function corresponding to the clicked button.

Even after the preview image starts to be displayed after operation 220, the switch 610 senses in operation 240 whether the user clicks the button, and if the user clicks the button, the function execution unit executes the function corresponding to the clicked button in operation 250. In this case, since the touch mode is changed to the click mode, the user executes the function right after the user obtains the information on the function corresponding to the clicked button through the preview image.

Figure 7:
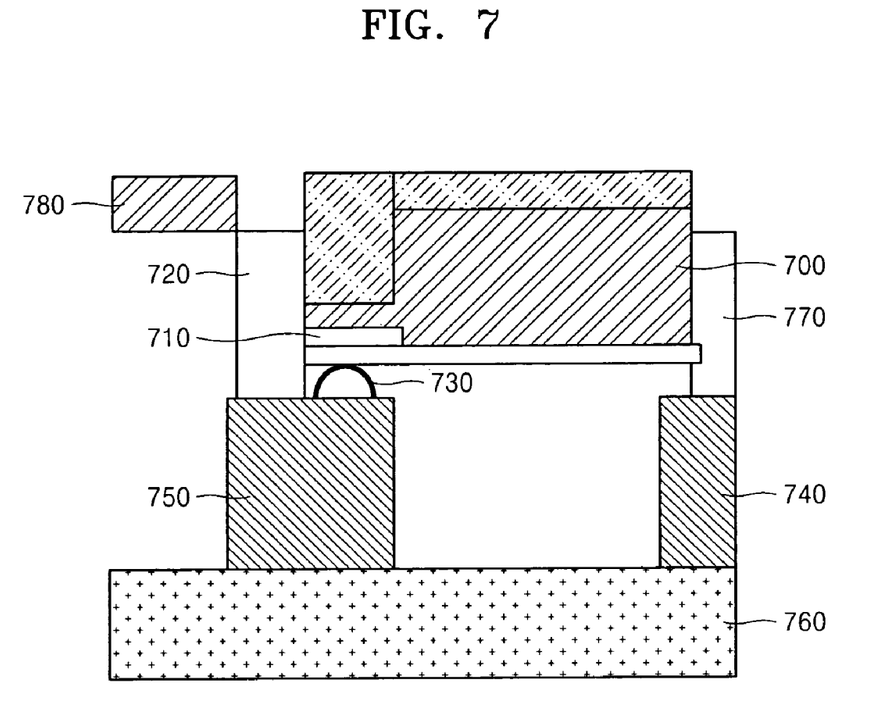
FIG. 7 is a sectional view of a button input apparatus according to an embodiment of the present invention.

FIG. 7 is a sectional view of a button input apparatus according to an embodiment of the present invention. The button input apparatus illustrated in FIG. 7 includes a button 700, a pressure sensing sensor 710, a button case 720, 770, and 780, a dome switch 730, printed circuit boards (PCBs) 740 and 750, and a display unit 760. The button 700 includes an opaque part and a transparent part, and the pressure sensing sensor 710 senses whether a user presses the button 700. If the user presses the button 700 with a pressure greater than a specified pressure, the dome switch 730 is activated, thereby sensing that a mode corresponding to the pressed button is the click mode.

Figure 8:
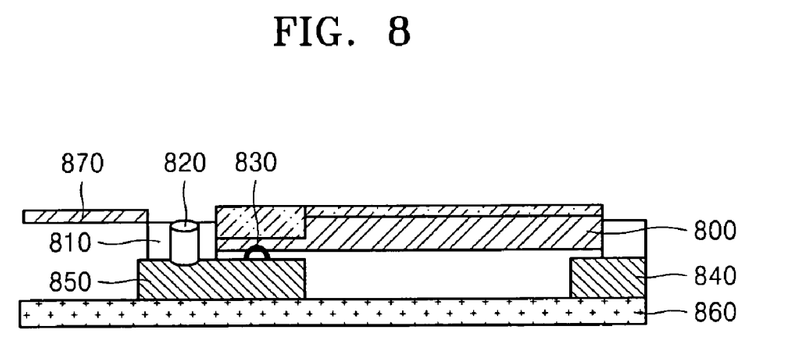
FIG. 8 is a sectional view of a button input apparatus according to an embodiment of the present invention.

FIG. 8 is a sectional view of a button input apparatus according to an embodiment of the present invention. The button input apparatus illustrated in FIG. 8 includes a button 800, a sensor supporter 810, a proximity sensor 820, a dome switch 830, PCBs 840 and 850, a display unit 860, and a button case 870. The button 800 includes an opaque part and a transparent part, and the proximity sensor 820 senses whether a user presses the button 800 by sensing the user's approach toward the button 800. If the user presses the button 800 with a pressure greater than a specified pressure, the dome switch 830 is activated, thereby sensing that a mode corresponding to the pressed button is the click mode.

Figure 9:
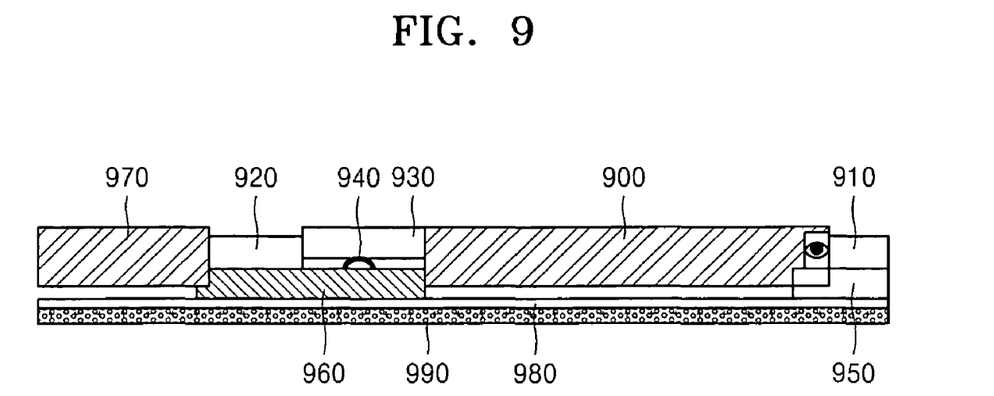
FIG. 9 is a sectional view of a button input apparatus according to an embodiment of the present invention.

FIG. 9 is a sectional view of a button input apparatus according to an embodiment of the present invention. The button input apparatus illustrated in FIG. 9 includes a button 900 and 930, a button case 910, 920, 950, and 970, a dome switch 940, a PCB 960, a electrostatic capacitance sensing sensor 980, and a display unit 990. The electrostatic capacitance sensing sensor 980 is made of a transparent substance so that a user can see an image displayed on the display unit 990 through the transparent button 900. The electrostatic capacitance sensing sensor 980 senses whether the user presses the button 900 and 930 by sensing an electrostatic capacitance generated when the user contacts the button 900 and 930. If the user presses the button 930 with a pressure greater than a specified pressure, the dome switch 940 is activated, thereby sensing that a mode corresponding to the pressed button is the click mode.

Embodiments of the present invention include computer readable codes on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to a method of inputting a function into a portable terminal and a button input apparatus using the same according to the above-described embodiments of the present invention, when a specific function, such as a phone call function and a short message function, is input into the portable terminal such as a cellular phone, information on a function corresponding to a pressed button is displayed when the user touches one of a plurality of buttons included in the portable terminal and the function corresponding to the pressed button is executed when the user clicks the button, so that the user can simply and conveniently use the portable terminal by inputting a plurality of functions using a small number of buttons.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of inputting a function into a portable terminal including a plurality of buttons, the method comprising:
   receiving a button input when a user presses one of the plurality of buttons on the portable terminal;
   determining whether a mode of the button input is a touch mode or a click mode; and
   displaying a preview image of a function corresponding to the pressed button when the button input mode is the touch mode and executing the function corresponding to the pressed button when the button input mode is the click mode,
   wherein the preview image is displayed on at least one of the plurality of buttons at the same time as the preview image is displayed on the main screen.

2. The method of claim 1, wherein, in the determining, the button input mode is determined to be the touch mode using at least one of an electrostatic capacitance sensing sensor and a pressure sensing sensor.

3. The method of claim 2, wherein, in the determining, the button input mode is determined to be the touch mode when a period of time when the user presses the button, the period of time being sensed using the at least one of the electrostatic capacitance sensing sensor and the pressure sensing sensor while the user is pressing the button, is longer than a specified period of time.

4. The method of claim 1, wherein, in the determining, the button input mode is determined to be the click mode using a switch working at a pressure greater than a specified pressure, and
   the button input mode is determined to be the click mode when the switch is activated.

5. The method of claim 1, wherein the preview image is an execution image of the function.

6. The method of claim 1, wherein the preview image is an image indicating information on functions subordinate to the function.

7. The method of claim 1, wherein the preview image is an image corresponding to the pressed button.

8. The method of claim 7, wherein, in the displaying, when the preview image is a moving picture, an important portion of the moving picture is displayed.

9. The method of claim 1, wherein the preview image is displayed while the user is pressing the button.

10. The method of claim 1, wherein the preview image is displayed on a portion of a main screen included in the portable terminal or the entire main screen.

11. A computer readable recording medium storing a computer program for executing the method of claim 1.

12. A button input apparatus included in a portable terminal, the apparatus comprising:
   a sensor to sense whether a user touches a button;
   a switch to sense whether the user presses the button with a pressure greater than a specified pressure;
   a mode determiner to determine whether a mode of a button input obtained by the user pressing the button is a touch mode or a click mode using output signals of the sensor and the switch; and
   a control signal generator to generate a control signal to display a preview image of a function corresponding to the button when the button input mode is the touch mode and to execute the function corresponding to the button when the button input mode is the click mode,
   wherein the preview image is displayed on the button at the same time as the preview image is displayed on the main screen.

13. The apparatus of claim 12, wherein the sensor is at least one of an electrostatic capacitance sensing sensor, a pressure sensing sensor, and a proximity sensor.

14. The apparatus of claim 13, wherein the mode determiner detects a button touch time of the user using an output signal of the sensor and determine that the button input mode is the touch mode when the detected button touch time is longer than a specified time.

15. The apparatus of claim 12, wherein the preview image is an execution image of the function.

16. The apparatus of claim 12, wherein the preview image is an image indicating information on functions subordinate to the function.

17. The apparatus of claim 12, wherein the preview image is an image corresponding to the pressed button.

18. The apparatus of claim 12, wherein the preview image is displayed while the user is pressing the button.

19. The apparatus of claim 12, further comprising a display unit to display an image displayed on the button, wherein
   the image displayed on the display unit is variable, and the preview image is displayed on the display unit.

20. The apparatus of claim 19, wherein the preview image is displayed on the display unit.

21. A button input apparatus comprising:
   a sensor to sense whether a user touches a button;
   a switch to sense whether a pressure of the touch exceeds a specified threshold;

a mode determiner to determine whether an input mode of the button is a touch mode or a click mode based on sensing results of the sensor and the switch; and a control signal generator to generate a control signal to display a preview image of a function corresponding to the button when the button input mode is the touch mode and to execute the function corresponding to the button when the button input mode is the click mode, wherein the preview image is displayed on the button at the same time as the preview image is displayed on the main screen.

22. The apparatus of claim 21, wherein the mode determiner determines that the button input mode is the touched mode when the button is touched with pressure that does not exceed the specified threshold or when a detected button touch time is longer than a specified time and determines that the button input mode is the click mode when the button is touched with a pressure that exceeds the specified threshold.

23. The apparatus of claim 21, wherein, after the preview image is displayed, the mode determiner changes the button input mode from the touch mode to the click mode when the button is touched with a pressure that exceeds the specified threshold.

* * * * *

UNITED STATES PATENT AND TRADEMARK OFFICE
CERTIFICATE OF CORRECTION

PATENT NO. : 7,817,143 B2
APPLICATION NO. : 11/589881
DATED : October 19, 2010
INVENTOR(S) : Byung-seok Soh et al.

Page 1 of 1

It is certified that error appears in the above-identified patent and that said Letters Patent is hereby corrected as shown below:

Title Page, Item (75) (Inventors), Line 5, change "Kwon-lu Lee" to --Kwon-ju Lee--.

Signed and Sealed this
Fourth Day of January, 2011

David J. Kappos
*Director of the United States Patent and Trademark Office*